Feb. 6, 1940.  G. T. PFLEGER  2,189,295
VARIABLE SPEED DRIVE SYSTEM
Filed July 11, 1933   2 Sheets-Sheet 2
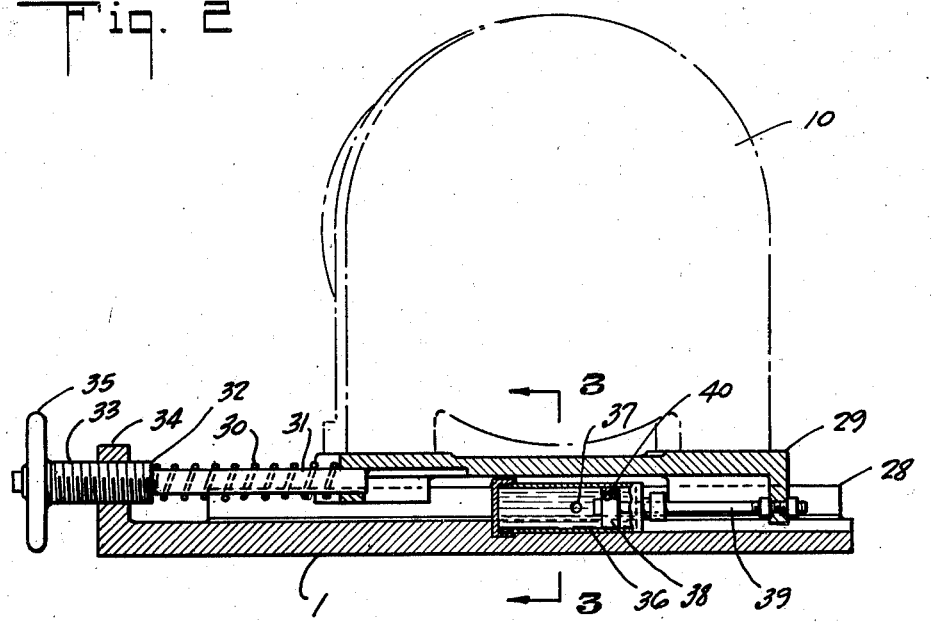
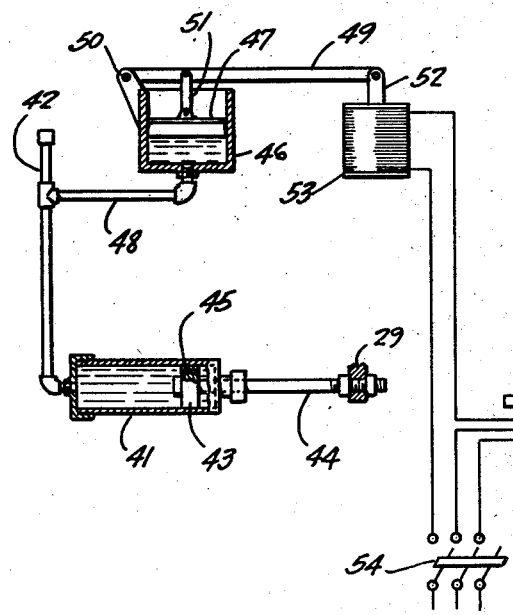
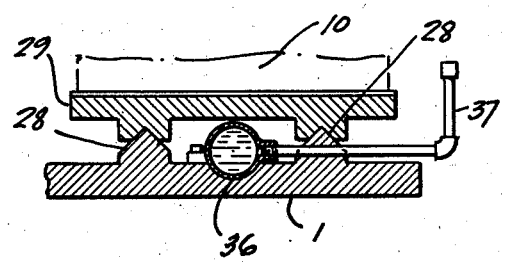
INVENTOR
George T. Pfleger
BY John Flam
ATTORNEY Patented Feb. 6, 1940

2,189,295

UNITED STATES PATENT OFFICE 2,189,295

VARIABLE SPEED DRIVE SYSTEM

George T. Pfleger, Los Angeles, Calif., assignor to U. S. Electrical Motors, Inc., a corporation of California Application July 11, 1933, Serial No. 679,897

23 Claims. (Cl. 74—230.17)

This invention relates to a mechanism for transmitting power from a source to a load. More particularly, the invention relates to an electric motor drive incorporating a pulley structure the effective diameter of which can be varied.

This variation in diameter is obtained by providing a pulley structure having a pair of sections with opposed inclined faces, the sections being relatively movable in an axial direction. The inclined faces are respectively engaged by the sides of a flexible V-belt, and when the faces are at a maximum distance apart, the belt can enter between them to form a minimum diameter pulley drive. When the faces are brought closer together, the belt is moved radially outwardly, and the effective pulley diameter is correspondingly increased.

In the present invention, the motor shaft carries a variable pulley structure, in which the separation of the sections is secured by a positive adjustment. This structure forms a driving pulley. The driven pulley has a fixed diameter. In order to keep the belt tight at all times, the motor is movably mounted on a guide whereby the center distance between the driven and driving pulleys can be automatically varied, as by the aid of a spring or other equivalent resilient means.

This application is a continuation in part of a prior application, Serial Number 667,387, filed April 22, 1933, and entitled "Variable speed electric motor drive".

It is one of the objects of the invention to improve in general, motor drives of this character.

It is another object of the invention to provide a resilient force for urging the centers apart between the driving and driven structures with a force that is determined by the load imposed upon the motor. In this way, the frictional force tending to keep the belt from slipping is made ample for all conditions of operation, and is not excessive for light loads.

It is still another object of the invention to provide a guide for the movement of the motor or the variable pulley structure, so arranged that the entire pulley structure is kept in alinement with the fixed diameter pulley, even if one of the sections of the variable pulley structure is axially fixed.

This invention possesses many other advantages, and has other objects which may be made more easily apparent from a consideration of several embodiments of the invention. For this purpose there are shown a few forms in the drawings accompanying and forming part of the present specification. These forms shall now be described in detail, which illustrate the general principles of the invention; but it is to be understood that this detailed description is not to be taken in a limiting sense, since the scope of the invention is best defined by the appended claims.

Referring to the drawings:

Fig. 2 is a sectional view taken along the plane 2—2 of Fig. 1, but omitting the motor;

Fig. 3 is a detail section taken along plane 3—3 of Fig. 2; and

Fig. 4 is a diagrammatic illustration of a modified form of the invention.

Figure 1:
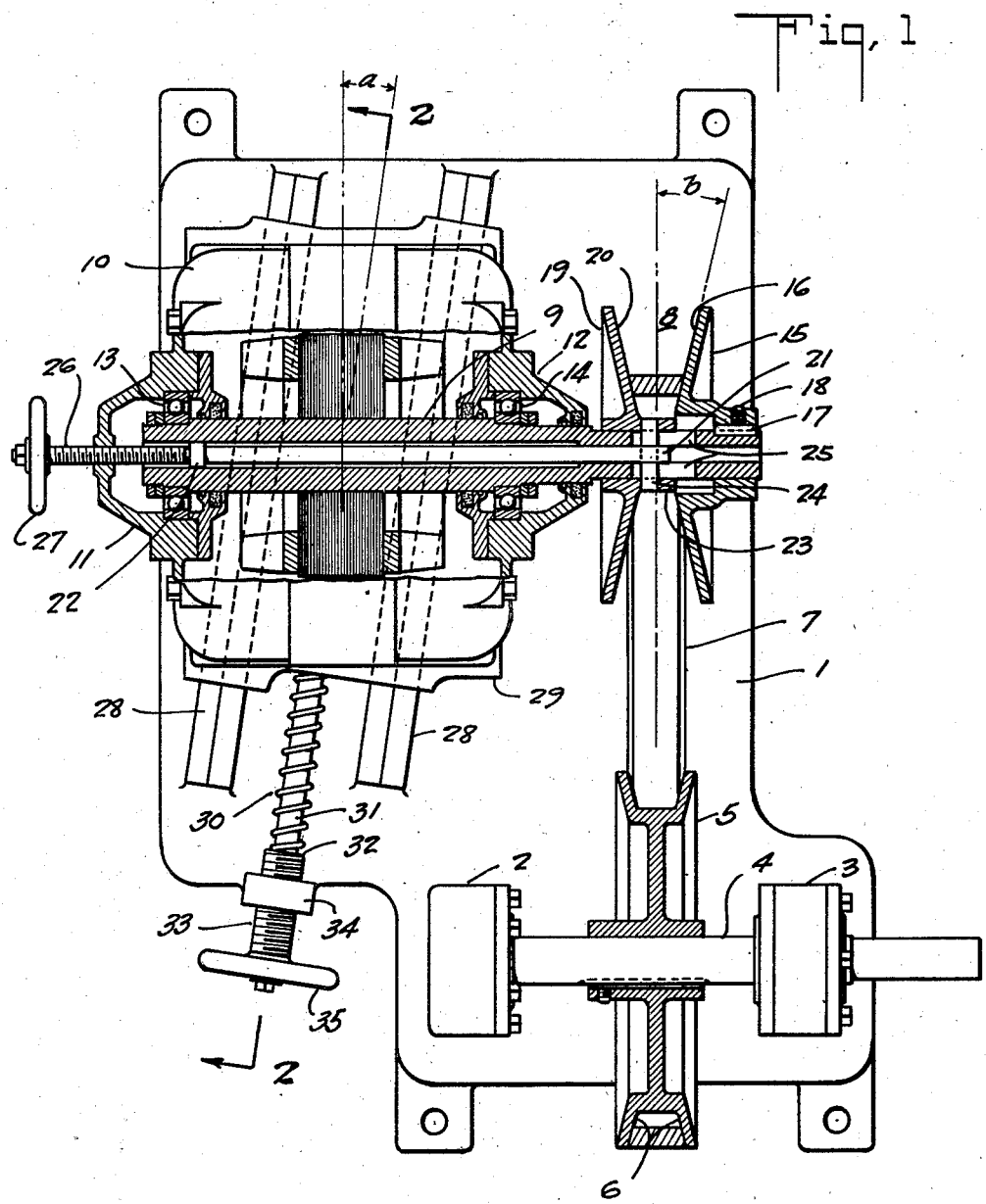
Figure 1 is a plan view, partly in section, of a variable speed transmission device incorporating the invention.

The main support for the entire mechanism is shown by a supporting member 1. This supporting member 1 supports bearing standards 2 and 3 in which is appropriately journalled a driven shaft 4. Upon this driven shaft is rigidly fastened, as by a key or set screw, or both, a fixed diameter pulley 5. Any appropriate load can be driven by shaft 4, which can be extended as shown, beyond the bearings, for this purpose.

Pulley 5 is shown as having a grooved or angled face 6. The inclined faces of this pulley are engaged by a flexible V-belt 7, in order to be placed in driving relation with a driving pulley structure 8.

The driving pulley structure 8 has a variable effective diameter, and is in driving relation with shaft 9 of an electric motor 10, or other source of motion. This electric motor, as shown most clearly in Fig. 1, has a frame with end bearing supports 11 and 12. The shaft 9 is appropriately journalled in these bearing supports, as by the aid of the ball bearing structures 13 and 14. The shaft 9 extends out of the bearing support 12 to accommodate the variable pulley structure 8. This pulley structure includes an axially fixed section 15 having an inclined face 16. It is fixed to shaft 9 as by the aid of a key 17 and set screw 18.

The corresponding pulley section 19 has an inclined face 20 opposed to the inclined face 16, and forming therewith a seat for the flexible belt 7.

Pulley section 19 is axially adjustable in a manner to be hereinafter described. In this way this section 19 can be brought closer to section 15 or farther apart. In the position shown in Fig. 1, the section 19 is substantially at its maximum distance from section 16, forming thereby a minimum effective diameter, because the belt 7 is allowed to move radially inwardly with respect to the axis of the pulley, or until the sides of the belt 7 engage the inclined faces.

However, if section 19 is moved toward the right, the effective pulley diameter of structure 8 is increased, because then the flexible belt 7 must move radially outwardly with respect to the axis of structure 8.

Before detailing the manner in which this outward radial movement of the belt is obtained, the mechanism for adjusting the position of section 19 will be described. For this purpose the shaft 9 is made hollow. Into the shaft extends a rod 21. This rod at its right hand end is freely slidable in a reduced aperture in the right hand end of shaft 9, and is provided with an enlargement or collar 22 at its left hand end, for sliding engagement with the interior of the shaft.

Rod 21, furthermore, is in mechanical connection with the hub 23 of section 19. This mechanical connection can be accomplished as by the aid of a pin 24 extending through the rod 21 and the hub 23, and passing through elongated slots 25 in shaft 9. It is apparent that the length of these slots determines the limits of relative axial movement of section 19 with respect to the section 15. The pin 24 is in driving relation with the shaft 9 by virtue of the slot construction, the slots effectively preventing relative angular motion of section 19 with respect to shaft 9.

In the present instance, the rod 21 can be positively urged toward the left for moving section 19 closer to section 15. This can be accomplished for example by the aid of a stud 26 threaded into the end of the bearing housing 11 and having a hand wheel 27 for manual manipulation. The end of this stud engages the left hand end of rod 21 so that by screwing stud 26 inwardly, the rod 21 is urged to the left. If necessary a long wearing washer can be interposed between stud 26 and rod 21.

Upon retraction of stud 26 outwardly of the hollow shaft 9, the section 19 is free to move away from section 15.

In order to take up the resultant slack in the belt when stud 26 is screwed outwardly with respect to the shaft 9, use is made of a resilient force, urging the entire pulley structure 8 away from the axis of shaft 4, causing a larger separation between the axes of the driving and driven shafts. In other words, the center distance is increased by the resilient force. Accordingly, this resilient force will cause the belt 7 to exert a force toward the left on the movable section 19 until this motion is stopped by contact of the left hand end of rod 21 with the end of the stud 26.

In this instance, since the hollow shaft 9 forms the shaft of the motor 10, the entire motor is movably mounted on appropriate guides. These guides are shown in Figs. 1, 2 and 3 as rails 28 formed in this instance integral with the base 1. These rails engage grooves in the bottom of the motor mounting 29. In order to urge the entire structure, comprising the motor 10 and the adjustable pulley structure 8, in such a direction as to increase the center distance between the driving and the driven structures, use is made in this instance of a compression spring 30. This compression spring is guided on a rod 31, one end of which extends loosely into the motor support 29. The corresponding end of the spring 30 abuts against the contiguous surface of the support 29;

and its other end abuts against a shoulder 32 formed integrally with the guide bar 31. In the present instance, in order to vary the force of the spring 30, an enlarged portion 33 of the guide rod 31 is shown as threaded into an upright boss 34 and it can be manipulated as by a hand wheel 35. The boss 34 thus serves as another support for rod 31. Thus by turning the threaded portion 33 into boss 34, the spring 30 is compressed, and the corresponding spring force exerted on the support 29 is increased.

It is apparent that if the rails 28 would run in a direction perpendicular to the axes of the shafts the belt 7 would not stay in alignment. This is true because as the axis of shaft 9 moves away from the axis of shaft 4, the belt 7 would move toward the left as viewed in Fig. 1 since the slope of the axially fixed face 16 is toward the left. In order to compensate of this effect, and to keep the belt 7 in substantially alignment at all times between the two pulley structures, the rails slant in a direction opposite to the movement that would be given to the belt by its engagement with the face 16. This slanting position is shown in Fig. 1, and is such as to maintain the belt continually in substantial alignment irrespective of the center distance between the shafts.

It has been found that the correct slope of the guides 28 is dependent upon the physical dimensions of the apparatus, such as the center distance between the shafts, the angle of inclination of the pulley faces, and the relative diameters of the two pulleys. If we denote by an angle $a$ (Fig. 1) the inclination of the guide 28 to a line drawn perpendicular to the axes of the shafts, and if we likewise denote by angle $b$ the inclination of the pulley face to the same perpendicular line, then it may be stated that as a result of observations, the ratio of the tangent of angle $a$ to the tangent of angle $b$ should lie between narrow limits in order to keep the belt substantially in alignment. These limits for practical designs of relative pulley diameters and center distances should fall between the values of .400 and .800. The lower limit of .400 corresponds to a condition where the variable pulley structure has a diameter materially larger than the diameter of the driven pulley, while the higher limit of .800 corresponds to a condition where the variable pulley structure has a considerably smaller diameter than the fixed diameter pulley. Where the pulley diameters are about the same order, and where the center distance spacing is considerable, a mean value of .640 for the ratio of these tangents is suitable. Under such circumstances, the variations in center distance and in the corresponding pulley diameters do not cause any appreciable belt misalignment.

The operation of the device as so far described can now be set forth. If it is desired to increase the diameter of pulley structure 8, the screw 26 is turned inwardly to urge rod 21 and section 19 toward the right. In so doing, the center distance between the shafts must be decreased, since the arc of contact between the belt 7 and the pulley structure 8 is increased. Accordingly, spring 30 is compressed and the entire pulley structure and motor 10 move downwardly on the guides 28. It is thus clear that movement of screw member 26 inwardly is translated into a compression of the spring 30.

To reduce the pulley diameters, the screw 26 is moved outwardly. Under such circumstances the spring 30 is allowed to expand, because it can now force motor 10 upwardly as viewed in Fig. 1, causing rod 21 to follow the withdrawal of screw 26. This rod is urged toward the left because of the engagement of the pulley face 20 with the left hand side of the belt 7.

At times when the load varies rapidly, or in the event of a rather sudden change in pulley diameter, a slight oscillation of the motor 10 on the rails 28 may occur. In order to damp such possible oscillations, use is made of a dash pot arrangement, shown to best advantage in Figs. 2 and 3. In the present instance, this dash pot comprises a cylinder 36 fastened to the top of the base 1 in a horizontal position. This cylinder can be filled with oil or other equivalent incompressible fluid, as by the aid of a fill pipe 37. Working in the cylinder 36 is a piston 38. The stem 39 of this piston is fastened to the moving support 29 of the motor 10. Oil is permitted to pass from one side to the other of piston 38 only through a restricted passageway, such as leakage past the edges of the piston, or through a constricted passageway 40. It is thus apparent that sudden jerks of the motor 10 on the guides 28 are effectively prevented, because an appreciable time must elapse for any material movement of piston 38 inside of the cylinder 36.

In the form of the invention as just described the resilient force tending to separate the axes of the shafts in order to increase the center distance is provided by a spring. However, other resilient mechanisms can be provided. For example, in Fig. 4 a fluid pressure cylinder 41 is shown which can be substituted for both the dash pot 36 and spring 30. This cylinder can be kept filled as by the aid of a fill pipe 42. Working in cylinder 41 is a piston 43 joined as by the stem 44 to the sliding base 29 of the motor. Although there may be leakage from one side of the piston 43 to the other as by the aid of a constricted passageway 45, yet if the fluid in cylinder 41 is kept under pressure it will exert a force on piston 43 toward the right because the left hand surface of piston 43 is greater than the right hand surface. There is thus a preponderance of pressure corresponding to the difference in the effective areas. At the same time, the device also operates as a dash pot, due to the use of the passageway 45.

It is thus seen that all that is necessary is to provide fluid pressure inside of cylinder 41, to create a belt tightening force. This can be accomplished for example by the aid of an auxiliary cylinder 46 and a piston 47, the interior of the cylinder 46 being in communication with cylinder 41 as by a conduit 48. Pressure can be exerted upon piston 47 to create the required fluid pressure. This can be accomplished by the aid of a lever 49 having a stationary pivot 50 and a link connection 51 to piston 47.

In the present instance it is preferred that this fluid pressure be varied in accordance with the conditions of energization of the motor 10. For this purpose the lever 49 carries a core 52 acted upon by an electromagnet or solenoid 53. This electromagnet can be so arranged that it is not energized until motor 10 is energized, as by the aid of the switch mechanism 54. Thus while the motor 10 is inactive there is no force tending to urge the motor along the guides 28. However, as soon as switch 54 is closed, both the solenoid 53 and the motor 10 are energized. In the present instance the solenoid is in series with one of the leads supplying current to motor 10. In this way, as the load on the motor 10 increases the pull on the magnet 53 increases, with a corresponding increase in pressure in cylinder 41. This is useful because this increase in pressure corresponds to greater pressure between the sides of belt 7 and the inclined faces 16 and 20 of pulley structure 8 whereby danger of slipping at heavy loads is minimized.

I claim:

1. In a system of the character described, a fixed diameter pulley, a variable diameter pulley structure in driving relation to said fixed diameter pulley, said structure having a pair of sections with opposed inclined faces, a shaft to which one of the sections is axially fixed, means for positively adjusting the axial position of the other section, a flexible belt between the pulley and the structure, a support for the pulley structure, said support forming a guide for movement of the pulley structure in a direction to vary the center distance between the fixed diameter pulley and the variable diameter structure, as well as in a direction to keep the belt in substantial alignment, resilient means for adjusting the center distance between the axes of said pulleys in response to the adjustment of said variable diameter pulley, and means restricting the rate of change of said center distance between the axes of said pulleys, said last mentioned means acting independently of the means adjusting the pulley diameter.

2. In a variable speed drive having a driving pulley structure, a driven pulley structure, an electric motor connected to the driving pulley structure, said driving pulley structure having a positively adjustable effective diameter, and a belt connecting the structures, the center distance between the structures being variable, the combination therewith of yielding means for adjusting the center distance between the axes of said pulleys in response to the adjustment of said variable diameter pulley, and means for increasing the force exerted by said yielding means, responsive to the energization of the motor.

3. In a variable speed drive having a driving pulley structure, a driven pulley structure, an electric motor connected to the driving pulley structure, said driving pulley structure having a positively adjustable effective diameter, and a belt connecting the structures, the center distance between the structures being variable, the combination therewith of yielding means for adjusting the center distance between the axes of said pulleys in accordance with the adjustment of said variable diameter pulley, and means, acting in accordance with the variation of the motor load, to increase the force exerted by said yielding means.

4. In a variable speed drive having a driving pulley structure, a driven pulley structure, an electric motor connected to the driving pulley structure, said driving pulley structure having a positively adjustable effective diameter, and a belt connecting the structures, the center distance between the structures being variable, the combination therewith of fluid pressure means for adjusting said center distance between the axes of said pulley structures in accordance with the adjustment of said variable diameter pulley.

5. In a variable speed drive having a driving pulley structure, a driven pulley structure, an electric motor connected to the driving pulley structure, said driving pulley structure having a positively adjustable effective diameter, and a belt connecting the structures, the center distance between the structures being variable, the combination therewith of fluid pressure means urging the structures apart tending to increase the center distance, and means for increasing the fluid pressure in accordance with the energization of the motor.

6. In a variable speed drive having a driving pulley structure, a driven pulley structure, an electric motor connected to the driving pulley structure, said driving pulley structure having a positively adjustable effective diameter, and a belt connecting the structures, the center distance between the structures being variable, the combination therewith of fluid pressure means urging the structures apart tending to increase the center distance, and means, acting in accordance with the variation of the motor load, to increase the fluid pressure.

7. In a variable speed drive having a belt in active power transmitting relation to a driving pulley structure and to a driven pulley structure, one of said pulley structures having a positively adjustable effective diameter and including a pair of pulley sections with opposed inclined faces, and the center distance between the axes of said pulley structures being variable, the combination therewith of means for adjusting the axial positions of said pulley sections by substantially equal and opposite amounts with respect to the driving belt, resilient means for adjusting the center distance between the axes of said pulley structure in accordance with the adjustment of said variable diameter pulley structure, and means for restricting the rate of change of said center distance between the axes of said pulley structures.

8. In a variable speed drive having a belt in active power transmitting relation to a driving pulley structure and to a driven pulley structure, one of said pulley structures having a positively adjustable effective diameter and including a pair of pulley sections with opposed inclined faces, and the center distance between the axes of said pulley structures being variable, the combination therewith of means for adjusting the axial positions of said pulley sections by substantially equal and opposite amounts with respect to the driving belt, a spring for adjusting the center distance between the axes of said pulley structures in response to the adjustment of said variable diameter pulley structure, and means for restricting the relative velocity of said structures in a center distance varying direction.

9. In a variable speed drive having a belt in active power transmitting relation to a driving pulley structure and to a driven pulley structure, one of said pulley structures having a positively adjustable effective diameter and including a pair of pulley sections with opposed inclined faces, and the center distance between the axes of said pulley structures being variable, the combination therewith of means for adjusting the axial positions of said pulley sections by substantially equal and opposite amounts with respect to the driving belt, resilient means for adjusting the center distance between the axes of said pulley structures in accordance with the adjustment of said variable diameter pulley structure, and a dash pot for damping the relative movement of the structures in a center distance varying direction.

10. In a variable speed drive having a belt in active power transmitting relation to a driving pulley structure and to a driven pulley structure, one of said pulley structures having a positively adjustable effective diameter, and the center distance between the axes of said pulley structures being variable, the combination therewith of fluid pressure means for adjusting the center distance between the axes of said pulley structures in accordance with the adjustment of said variable diameter pulley.

11. In a variable speed drive having a belt in active power transmitting relation to a driving pulley structure and to a driven pulley structure, one of said pulley structures having a positively adjustable effective diameter, and the center distance between the axes of said pulley structures being variable, the combination therewith of fluid pressure means for adjusting the center distance between the axes of said pulley structures in accordance with the adjustment of said variable diameter pulley and means for varying the force exerted by said fluid pressure device.

12. In a variable speed drive having a belt in active power transmitting relation to a driving pulley structure and to a driven pulley structure, one of said pulley structures having a positively adjustable effective diameter, and the center distance between the axes of said pulley structures being variable, the combination therewith of yielding means for adjusting the center distance between the axes of said pulley structure in accordance with the adjustment of said variable diameter pulley structure, and electroresponsive means for varying the force exerted by said yielding means.

13. In a variable speed drive having a belt in active power transmitting relation to a driving pulley structure and to a driven pulley structure, one of said pulley structures having a positively adjustable effective diameter, and the center distance between the axes of said pulley structures being variable, the combination therewith of fluid pressure means for adjusting the center distance between the axes of said pulley structures in accordance with the adjustment of said variable diameter pulley, and a solenoid for varying the fluid pressure exerted by said fluid pressure means.

14. In a variable speed drive having a belt in active power transmitting relation to a driving pulley structure and to a driven pulley structure, one of said pulley structures having an adjustable effective diameter, and the center distance between the axes of said pulley structures being variable, the combination therewith of fluid pressure means for adjusting the center distance between the axes of said pulley structures in accordance with the adjustment of said variable diameter pulley structure, said fluid pressure means including a pair of variable volume chambers, means forming a passage connecting said chambers, a volume of fluid enclosed by said chambers and said passage, means actuated in response to a change in the volume of one of said chambers for adjusting said center distance between the axes of said pulley structures, and means for adjusting the volume of the other of said chambers.

15. The structure as set forth in claim 14, in which said passage provides means for restricting the rate of change of said center distance.

16. The structure as set forth in claim 14, in which additional means are provided for restricting the rate of change of said center distance.

17. The structure as set forth in claim 14, in which additional means are provided for varying the volume of liquid enclosed by said variable volume chambers and said connecting passage.

18. In an adjustable speed drive, a driving pulley structure, a driven pulley structure, a belt in active power transmitting relation to said pulley structures, one of said pulley structures having an adjustable effective diameter, said adjustable diameter pulley structure having a pair of pulley sections with opposed inclined faces, a shaft to which one of the pulley sections is axially fixed, means for positively adjusting the axial position of the other pulley section, a support for one of the pulley structures, said support forming a guide for the movement of the supported pulley structure in a direction to vary the center distance between the two pulley structures, as well as in a direction to keep the belt in substantial alignment, resilient means for adjusting the center distance between the axes of said pulley structures in accordance with the adjustment of said adjustable diameter pulley structure, and means restricting the rate of change of said center distance between the axes of said pulley structure.

19. In an adjustable speed drive having a belt in active power transmitting relation to a driving pulley structure and a driven pulley structure, one of said pulley structures having a variable effective diameter and including a pair of pulley sections with opposed inclined faces, and the center distance between the axes of said pulley structures being variable, the combination therewith of means for adjusting the relative axial position of said pulley sections and fluid pressure means for adjusting the center distance between the axes of said pulley structures simultaneously with the adjustment of said variable diameter pulley structures.

20. In an adjustable speed drive having a driving pulley structure, a driven pulley structure, a belt in active power transmitting relation to said pulley structures, one of said pulley structures having a positively adjustable effective diameter, the center distance between the pulley structure being variable, the combination therewith of yielding means for adjusting the center distance between the axes of said pulley structures in accordance with the adjustment of said variable diameter pulley structure, and means acting in accordance with the power transmitted, to increase the force exerted by said yielding means.

21. In an adjustable speed drive, a driving pulley structure, a driven pulley structure, a belt in active power transmitting relation to said pulley structures, one of said pulley structures having an adjustable effective diameter, said adjustable diameter pulley structure having a pair of pulley sections with opposed inclined faces, a shaft to which one of the pulley sections is axially fixed, means for positively adjusting the axial position of the other pulley section, means for adjustably mounting one of said pulley structures for movement in a direction to adjust the center distance between the two pulley structures, as well as in a direction to keep the belt in substantial alignment, means for adjusting the center distance between the axes of said pulley structures in accordance with the adjustment of said adjustable diameter pulley structure, and means for restricting the rate of change of said center distance between the axes of said pulley structures.

22. In a variable speed drive having a belt in active power transmitting relation to a driving pulley structure and a driven pulley structure, one of said pulley structures having an adjustable effective diameter, and the center distance between the axes of said pulley structures being variable, the combination therewith of fluid pressure means for adjusting the center distance between the axes of said pulley structures, and means for varying the force exerted by said fluid pressure means.

23. In an adjustable speed drive having a driving pulley structure, a driven pulley structure, a belt in active power transmitting relation to said pulley structures, an electric motor connected to the driving pulley structures, one of said pulley structures having a positively adjustable effective diameter, and the center distance between the pulley structures being variable, the combination therewith of yielding means for adjusting the center distance between the axes of said pulley structures in accordance with the adjustment of said variable diameter pulley structure, and means for increasing the force excited by said yielding means in accordance with the energization of the motor.

GEORGE T. PFLEGER.